(12) United States Patent
Ostrem et al.

(10) Patent No.: US 7,988,094 B2
(45) Date of Patent: Aug. 2, 2011

(54) AIRCRAFT WINDOW EROSION SHIELD

(76) Inventors: Scott Ernest Ostrem, Tulsa, OK (US);
Kevin Steven Jackson, Tulsa, OK (US);
Stephen Frederick Joseph Wallace,
Tulsa, OK (US); Bobby Jack Ainsworth, Sapulpa, OK (US); Richard William Brigman, Everett, WA (US)

( * ) Notice: Subject to any disclaimer, the term of this patent is extended or adjusted under 35 U.S.C. 154(b) by 802 days.

(21) Appl. No.: 12/008,168

(22) Filed: Jan. 9, 2008

(65) Prior Publication Data

US 2008/0169381 A1 Jul. 17, 2008

Related U.S. Application Data

(60) Provisional application No. 60/880,100, filed on Jan. 12, 2007.

(51) Int. Cl.
*B64C 1/14* (2006.01)
(52) U.S. Cl. ................. 244/129.3; 244/121
(58) Field of Classification Search ............... 244/129.3, 244/121, 131; 296/201
See application file for complete search history.

(56) References Cited

U.S. PATENT DOCUMENTS

| | | | |
|---|---|---|---|
| 2,169,788 A | 8/1939 | Berndt et al. | |
| 2,388,786 A | 11/1945 | Knight et al. | |
| 2,617,174 A * | 11/1952 | Knuuti | 29/33 R |
| 2,978,995 A | 4/1961 | Dean | |
| 3,919,022 A | 11/1975 | Stefanik | |
| 4,284,677 A | 8/1981 | Kerliczek | |
| 4,486,996 A | 12/1984 | Alejos | |
| 4,625,484 A | 12/1986 | Oboler | |
| 4,649,080 A | 3/1987 | Fischer et al. | |
| 4,666,873 A * | 5/1987 | Morris et al. | 501/96.4 |
| 4,891,179 A | 1/1990 | Peacock et al. | |
| 4,960,631 A | 10/1990 | Walters et al. | |
| 5,443,912 A * | 8/1995 | Olson | 428/425.6 |
| 5,506,057 A * | 4/1996 | Olson | 428/425.6 |
| 5,667,866 A | 9/1997 | Reese | |
| 6,248,024 B1 | 6/2001 | Nelson et al. | |
| 6,887,914 B2 | 5/2005 | Czaplicki et al. | |
| 6,920,693 B2 | 7/2005 | Hankins et al. | |
| 6,924,021 B1 | 8/2005 | Colegrove et al. | |
| 7,008,580 B2 | 3/2006 | Eberth et al. | |
| 7,014,806 B2 | 3/2006 | Edelmann et al. | |
| 7,080,807 B2 * | 7/2006 | Olson et al. | 244/129.3 |
| 7,118,070 B2 * | 10/2006 | Abrams et al. | 244/129.3 |

(Continued)

FOREIGN PATENT DOCUMENTS

FR 2612174 A1 * 9/1988

(Continued)

OTHER PUBLICATIONS

U.S. Appl. No. 12/008,142, filed Jan. 9, 2008, K.S. Jackson et al.

(Continued)

*Primary Examiner* — Christopher P Ellis
(74) *Attorney, Agent, or Firm* — Francis L. Conte (57) ABSTRACT

An erosion shield for an aircraft window includes an annular band having a radially outer brim and a radially inner clip. The shield is sized to cover a composite window frame having an outer rim and an inner sash around a central aperture in which is mounted a window pane. The clip is asymmetrical around the central aperture to protect the sash and permit assembly of the shield thereto.

25 Claims, 7 Drawing Sheets

U.S. PATENT DOCUMENTS

| | | |
|---|---|---|
| 7,138,167 B2 | 11/2006 | Sakonjo et al. |
| 7,153,576 B2 | 12/2006 | Wang et al. |
| 7,175,795 B2 | 2/2007 | Eberth et al. |
| 2003/0062450 A1 | 4/2003 | Dazet et al. |
| 2003/0168775 A1 | 9/2003 | Ebert et al. |
| 2003/0234322 A1* | 12/2003 | Bladt et al. .................. 244/129.3 |
| 2004/0021334 A1 | 2/2004 | Blevins et al. |
| 2004/0219251 A1 | 11/2004 | Eberth et al. |
| 2004/0262453 A1 | 12/2004 | Sanz et al. |
| 2005/0042410 A1 | 2/2005 | Sakonjo et al. |
| 2005/0164023 A1 | 7/2005 | Davis et al. |
| 2006/0169396 A1 | 8/2006 | Joern |
| 2006/0249868 A1 | 11/2006 | Brown et al. |
| 2006/0284016 A1* | 12/2006 | Balsillie et al. ............ 244/129.3 |
| 2008/0067288 A1 | 3/2008 | Eberth et al. |
| 2008/0078876 A1 | 4/2008 | Baggette et al. |
| 2008/0217479 A1* | 9/2008 | Wood ......................... 244/129.3 |

FOREIGN PATENT DOCUMENTS

| | | |
|---|---|---|
| WO | WO 2005/115728 A1 | 12/2005 |
| WO | WO 2005/115836 A1 | 12/2005 |
| WO | WO 2005/115837 A1 | 12/2005 |
| WO | WO 2005/115838 A1 | 12/2005 |
| WO | WO 2005/115839 A1 | 12/2005 |
| WO | WO 2005/115840 A1 | 12/2005 |
| WO | WO 2005/115841 A1 | 12/2005 |

OTHER PUBLICATIONS

Hexcel Corporation, "HexMC Sheet-molding compound," six pages from hexcel.com website for product commercially available for more than 1 year before Jan. 1, 2008.

Fudge, "HexMCtm—Composites in 3D (A New High Performance Molding Compound)," SAMPE 2001, Long Beach, CA May 6-10, 2001, pp. 14.

* cited by examiner

AIRCRAFT WINDOW EROSION SHIELD

This application claims the benefit of U.S. Provisional Application No. 60/880,100; filed Jan. 12, 2007.

BACKGROUND OF THE INVENTION

The present invention relates generally to aircraft, and, more specifically, to windows therein.

In the typical commercial aircraft, numerous windows are distributed along both sides of the fuselage from the cockpit aft to just before the tail. The fuselage is tubular and varies in diameter or radius between the forward and aft ends of the aircraft, and correspondingly the size and curvature of the windows also vary along the length of the aircraft.

Each window includes a frame suitably mounted in a corresponding aperture in the external skin of the aircraft, and each frame securely mounts therein a corresponding window pane.

Typical aircraft skins are made of high strength metal, such as aluminum, and the typical window frame is also made of high strength metal. Various metal fabrication methods are therefore used to fabricate the individual window assemblies for the different size and strength requirements therefore depending upon the specific location of the window along the length of the aircraft.

Aircraft weight directly affects aircraft efficiency during flight, and aircraft are therefore being continually developed for reducing weight while providing sufficient strength of the various aircraft components for enjoying long service life during commercial operation.

Furthermore, the cost of commercial aircraft operation is a paramount design objective especially with the ever increasing price of engine fuel. The initial manufacturing cost of the aircraft itself is also an important design objective, with both the cost of the initial aircraft purchase and subsequent cost of operation being significant criteria in the competitive evaluation of aircraft and their expected low cost operation during the service life.

Accordingly, it is desired to provide a lightweight composite aircraft window frame, and protective shield therefor.

BRIEF DESCRIPTION OF THE INVENTION

An erosion shield for an aircraft window includes an annular band having a radially outer brim and a radially inner clip. The shield is sized to cover a composite window frame having an outer rim and an inner sash around a central aperture for receiving a window pane. The clip is asymmetrical around the central aperture to protect the sash and permit assembly of the shield thereto.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
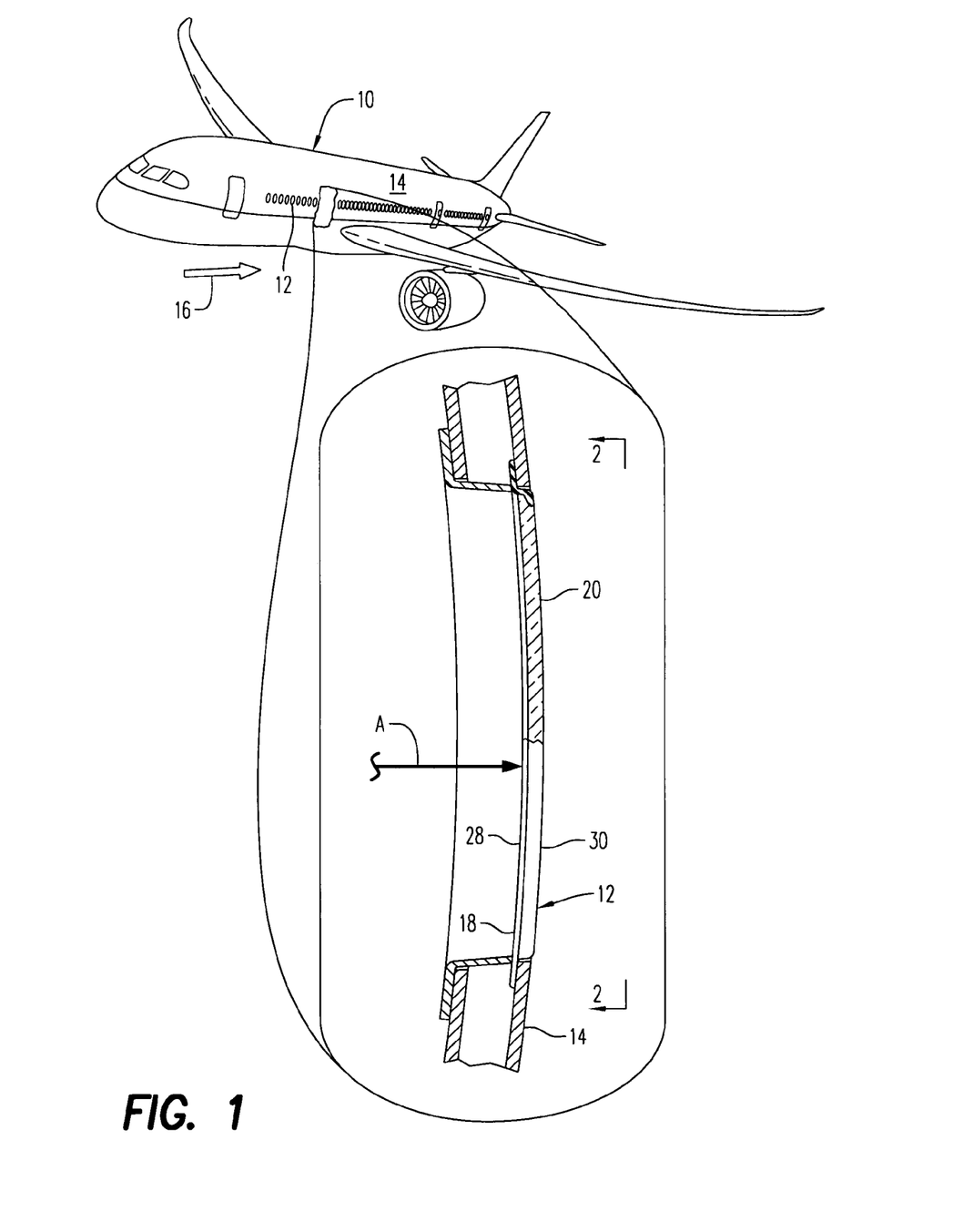
FIG. 1 illustrates an exemplary commercial aircraft in flight, with an enlarged elevational sectional view of the one of the numerous windows found therein.

FIG. 1 illustrates an exemplary airplane or aircraft 10 powered by gas turbofan engines in flight. The aircraft includes numerous windows 12 arranged in rows along both sides of the fuselage or outer skin 14 from the forward cockpit end of the aircraft to just before the aft tail.

The windows maintain the pressure integrity of the cabin and protect the passengers therein from the external environment, including the fast stream of external air 16 flowing aft over the outer skin during aircraft flight.

Each window is suitably mounted through a corresponding aperture in the aircraft skin 14, and the windows vary in size and configuration along the length of the aircraft. Since the fuselage 14 is generally cylindrical or tubular it has an internal diameter, or radius A which varies along the length of the aircraft from the sharp nose, through the wide passenger body, and to the sharp tail.

Each window 12 is specifically sized and configured to match the local curvature, or radius A, of the aircraft skin, and therefore many differently sized windows are required for each aircraft, and must be manufactured during production with corresponding differences.

The numerous windows in the aircraft may be identical in design but may suitably vary in configuration, including size and curvature thereof. An exemplary window 12 is initially illustrated in transverse section in FIG. 1 and in plan view in FIG. 2. Each window includes a unitary composite window frame 18 in which is suitably mounted a conventional, transparent window pane 20. The frame 18 itself is suitably mounted through the corresponding aperture in the aircraft skin 14 and supports the pane therein.

Figure 3:
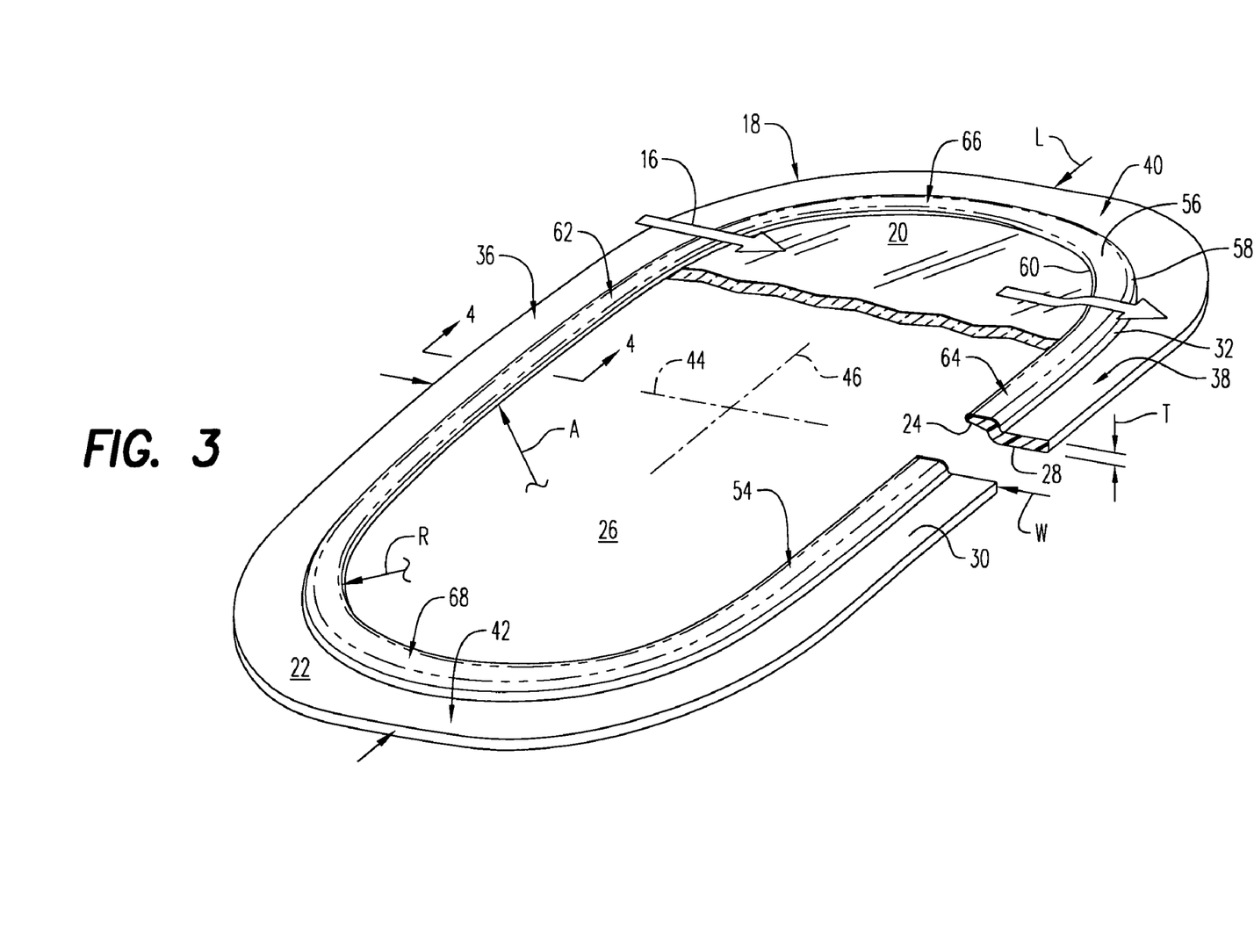
FIG. 3 is a partly sectional, isometric view of the exemplary window illustrated in FIG. 2 taken in isolation from the aircraft.
Figure 4:
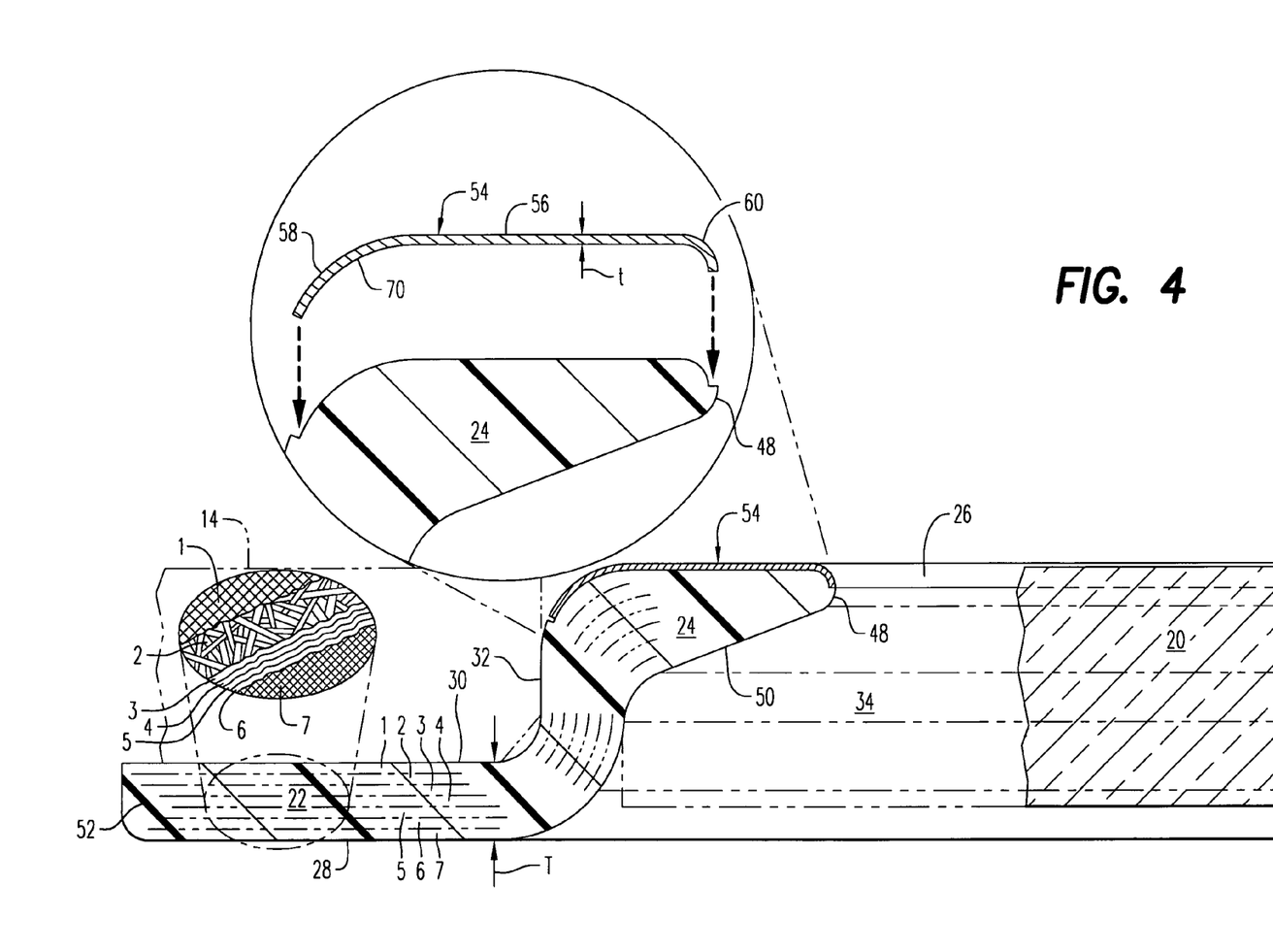
FIG. 4 is an enlarged cross sectional view of a portion of the window illustrated in FIG. 3 and taken along line 4-4.

The composite frame 18 is illustrated in more detail in an exemplary embodiment in FIGS. 3 and 4. The frame includes a radially outer annular flange or rim 22 and a concentric, radially inner annular flange or sash 24 surrounding a central aperture 26 which is sealingly closed by the window pane 20 mounted therein.

The sash 24 is transversely offset from the rim 22 across the thickness T thereof in common laminations across that thickness. The laminated rim and sash include a plurality of lamina or layers, 1-7 for example, which extend laterally or radially therethrough along the radial axis R of the frame.

The laminae or layers are preferably different from each other transversely between the opposite inboard and outboard sides 28,30 of the frame which correspond with the inboard or internal side of the aircraft cabin and the outboard or external side of the aircraft skin.

The sash 24 illustrated in FIG. 4 is elevated above and transversely bridged to the lower rim 22 by an annular rib 32 around the full circumference of the central aperture 26. The inboard side of the sash 24 and rib 32 define a central pocket 34 in which the window pane 20 may be mounted. The sash 24, or sash bar, defines an annular muntin in which the window pane 20 may be mounted and trapped, and withstands the differential pressure exerted across the window from the pressurized aircraft cabin.

Figure 2:
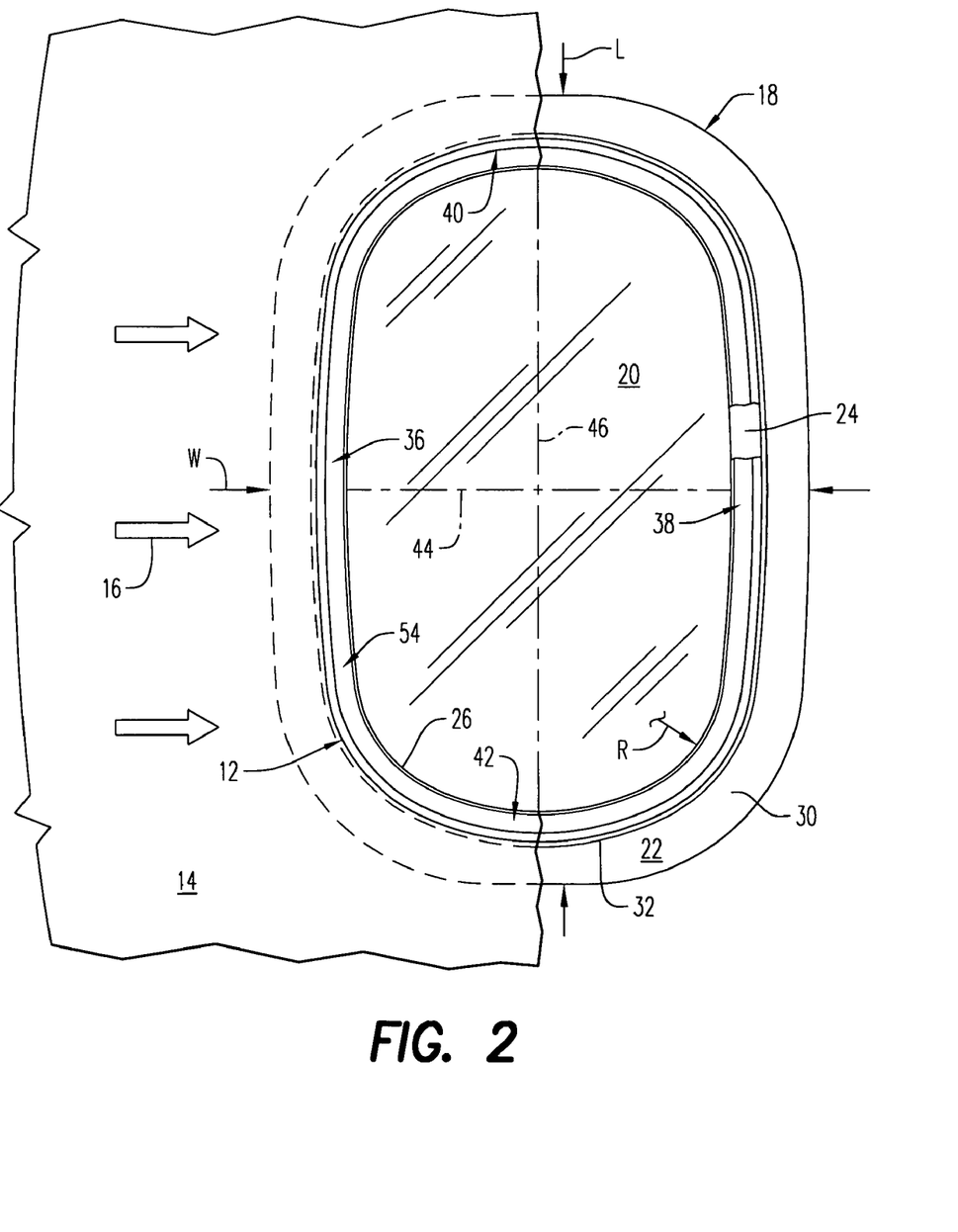
FIG. 2 is an elevation view of the outboard side of the exemplary window illustrated in FIG. 1 mounted in a portion of the fuselage and taken along line 2-2.

The rim 22, sash 24, and rib 32 are integral with each other in a single or unitary component, and are continuous in circumference around the central aperture 26 illustrated in FIGS. 2 and 3.

The integral rim, sash, and rib therefore collectively define forward and aft vertical columns or posts 36,38, and upper and lower horizontal rails 40,42 integrally joined to the opposite ends thereof.

The posts 36,38 are spaced apart laterally or horizontally along a minor axis 44 of the frame 18, and define the horizontal width W of the frame.

The two rails 40,42 are spaced apart longitudinally or vertically along a longer major axis 46 of the frame and define the height or length L thereof.

The two side posts 36,38 laterally bound the central aperture 26, and the two rails 40,42 provide an upper header and lower sill which vertically bound the central aperture 26, and collectively, the posts and rails completely surround the central aperture 26 laterally or circumferentially.

The rim 22 illustrated in FIGS. 3 and 4 has a preferably uniform thickness T from the outer perimeter of the frame to its junction with the perpendicular rib 32 and provides sufficient surface area for structurally attaching the window frame to the aircraft skin typically using bolts or other suitable fasteners.

Correspondingly, the sash 24 tapers or decreases in thickness radially inwardly from its junction with the rib 32 to the radially inner perimeter of the sash which defines a relatively thin arcuate lip 48 that circumferentially surrounds or bounds the central aperture 26.

In the preferred embodiment, the outboard side 30 along the sash 24 is generally parallel to the inboard side 28 along the rim 22 in two different generally flat planes spaced transversely apart by the bridging rib 32.

Correspondingly, the inboard side 28 of the sash 24 slopes radially outwardly toward the offset lower rim 22 to its junction with the transition rib 32 to form a sloped annular seat 50 completely surrounding the window pane 20 which has a corresponding beveled perimeter conforming with the seat bevel.

In this way, differential pressure loads acting on the window pane during flight are carried through the beveled joint to the tapered sash 24, which sash 24 has a relatively thick arcuate fillet or junction with the transition rib 32 for in turn carrying the pressure loads to the surrounding rim with reduced stress.

The rim 22, rib 32, and sash 24 illustrated in FIG. 4 provide a continuous structural loadpath between the concentric outer and inner perimeters of the frame, and the common layers 1-7 extend radially therethrough and comprise high-strength fibrous laminae fixedly bound in a rigid resin matrix 52 illustrated schematically in FIG. 4.

The different layers illustrated in FIG. 4 preferably include an externally exposed outboard layer 1 facing outwardly from the aircraft to the environment, a transversely opposite, internally exposed inboard layer 7 facing inwardly in the aircraft cabin, and a plurality of different inside or middle layers 2-6, for example, laminated and hidden between the opposite outboard and inboard layers.

The exposed common outboard layer 1 completely covers the outboard or external face of the window frame to provide tailored protection thereof, including lightning protection.

Additional protection for the window frame may be provided by bonding an annular erosion shield 54 to the outboard side of the sash 24 as shown in FIGS. 2-4. The erosion shield is preferably thin sheet metal, such as titanium, and provides a continuous metal annulus along the posts 36,38 and rails 40,42 completely surrounding the central aperture 26 to protect against wind and rain erosion.

The height or depth of the offset between the sash 24 and rim 22 illustrated in FIG. 4 is selected to match the thickness of the surrounding aircraft skin 14, shown in phantom, so that the outboard surface of the sash will be substantially flush with the outboard surface of the aircraft skin.

Correspondingly, the thin erosion shield 54 is recessed in the sash and projects slightly proud or outboard of the aircraft skin by about 1-3 mils (0.02-0.08 mm) to provide a slightly elevated relief for ensuring that the erosion shield takes the wind and rain erosion instead of the window pane and edge of the skin. The slight protrusion of the smooth erosion shield nevertheless provides smooth aerodynamic flow of the ambient air 16 as it flows past the window during aircraft operation at speed.

Furthermore, the erosion shield 54 illustrated in FIG. 4 conforms with the flat outboard surface of the sash and has arcuate opposite edges blending inwardly into the aircraft. For example, the erosion shield 54 preferably wraps in part around the sash lip 48 to minimize or eliminate direct exposure of the underlying composite laminate to the external freestream air 16 which can contain rain or debris particles that could otherwise erode the relatively softer composite sash.

The composite laminated window frame 18 illustrated in FIG. 3 enjoys specific advantages in design, strength, and manufacture, as well as in the cost of manufacture and durability in service life. The window frame 18 is defined by its common rim 22, sash 24, and transition rib 32 which may be suitably varied in size, thickness, and configuration, with corresponding differences in length L, width W, and curvature in different planes represented by the annular radius R of the window frame itself, as well as the vertical curvature A of the window frame conforming with the local curvature of the tubular aircraft cabin.

Figure 5:
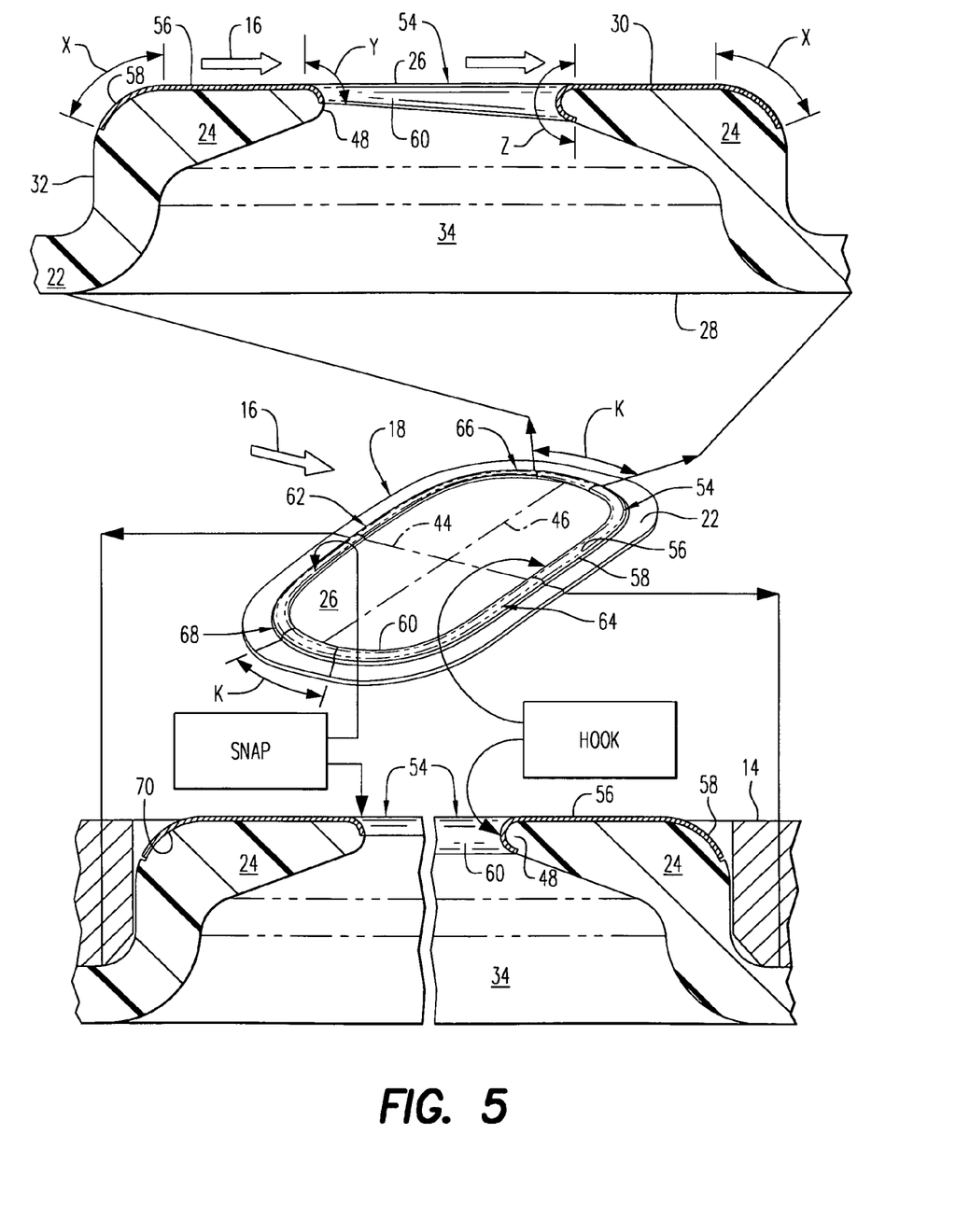
FIG. 5 is a schematic view of the aircraft window illustrated in FIG. 3 showing enlarged transverse cross sections of the sash mounted erosion shield in an exemplary embodiment.

The erosion shield 54 is illustrated in more detail in FIG. 5. The shield is a unitary or one-piece component having an annular band 56 integrally formed with a radially outer brim 58 and radially inner hook or clip 60. These three components of band 56, brim 58, and clip 60 define in its entirety the relatively simple erosion shield 54 which is preferably formed from a unitary metal sheet, or sheet metal, having a constant thickness t.

The sheet metal shield 54 is preferably formed of thin titanium with a small thickness t of about 8 mils (0.2 mm) for being lightweight and having enhanced strength, durability, and elastic and plastic flexibility.

The band 56 forms the middle annulus of the shield and is flat sheet metal for its smooth inboard and outboard surfaces.

The outer brim 58 forms an outwardly convex bullnose smoothly blending with the flat band 56, and the inner clip 60 forms another outwardly convex bullnose also blending smoothly with the flat bend 56.

The outer brim 58 provides an external bullnose or bow which is aerodynamically smooth on the outboard side of the shield and blends into the aircraft skin, and similarly the inner clip 60 provides another smooth external bullnose along the opposite edge of the middle band and blends smoothly with the window pane.

The erosion shield 54 conforms with the exposed outboard surface of the supporting sash 24 to which it is suitably secured. The band 56 is preferably bonded to the flat surface of the sash, with the outer brim blending the band to the surrounding rim 22 of the frame where it meets the outer skin 14 of the fuselage. And, the inner clip 60 lines or covers the lip end of the sash 24 around the central aperture 26 in which the window pane 20 is mounted.

Particular advantages of the sheet metal erosion shield 54 are its unitary and fully annular configuration and its thin profile having three dimensional (3D) breadth. These features permit effective manufacture of the shield itself, advantages in assembly thereof with the supporting window frame, and preferential protection against erosion of the underlying composite window frame when used in the aircraft application flying at high speed in the environment.

The metal erosion shield protects the composite frame from damage and erosion from high speed rain and from high speed debris particles carried in the airstream.

FIGS. 2 and 3 illustrate the predominant horizontal flow of the airstream 16 during flight operation in the aircraft. FIG. 5 also illustrates the predominant aft flow of air 16 during operation which travels differently over the different portions of the generally oblong aircraft window.

Accordingly, the annular erosion shield 54 is preferentially asymmetric around its circumference and around the common central aperture 26 of the shield itself and the supporting window frame 18.

The erosion shield 54 initially illustrated in FIG. 3 is sized and configured to match the size and configuration of the exposed laminated sash 24 of the window frame 18 for protecting that sash during flight in aircraft operation. Like the frame 18, the corresponding components of the shield 54 are similarly configured.

More specifically, the band 56, brim 58, and clip 60 of the unitary shield 54 collectively form forward and aft vertical posts 62,64 spaced apart laterally or horizontally along the common minor axis 44 of the shield and frame, and further form upper and lower horizontal rails 66,68 spaced apart longitudinally or vertically along the longer major axis 46 yet again common to the shield and frame. The corresponding posts and rails of the shield 54 and underlying frame circumferentially surround the common central aperture 26 in which is mounted the window pane.

Asymmetry is preferentially introduced into the annular shield 54 surrounding the central aperture 26 both for preferential erosion protection of the underlying frame and for enhanced aerodynamic performance, for example. More specifically, the middle band 56 is flat or even sheet metal, and is flat and straight in transverse section across the shield as illustrated in more detail in FIG. 5.

Correspondingly, the outer brim and inner clip 60 which bound the circumference of the band are both laterally arcuate or bowed from the common inboard side thereof to form an annular inside groove or track 70 surrounding the central aperture 26. The inside track 70 is sized and configured to match the annular profile of the sash 24 on which it is mounted.

In contrast, the opposite outboard side 30 of the shield 54 is continuously smooth over the convex brim 58 and clip 60 and the flat middle band 56 therebetween to provide an aerodynamically even and smooth exposed surface around the full circumference of the shield which is exposed during operation to the ambient, high speed air 16 illustrated schematically in FIG. 5.

Due to the 3D configuration of the oblong window illustrated in FIG. 5, the annular clip 60 which surrounds the central aperture 26 is preferably symmetrical on the opposite upper and lower sides of the minor axis 44, while being unsymmetrical or asymmetrical on the opposite forward and aft sides of the major axis 46.

Correspondingly, the annular band 56 and integral outer brim 58 are preferably symmetrical or uniform circumferentially around the asymmetric inner clip 60 which surrounds the central aperture 26.

The convex brim 58 preferably has a uniform arc length X radially outwardly from its juncture with the middle band 56, with the arc length being uniform circumferentially around the posts 62,64 and rails 66,68 of the entire shield. The arc length X should be sufficient to blend the erosion shield suitably inboard around the full perimeter of the underlying sash 24 to prevent the high speed external air 16 from infiltrating beneath the shield and preventing undesirable lifting forces thereon.

As shown in FIG. 5, the outer brim 58 blends inboard below the external surface of the surrounding outer skin 14 of the fuselage, and the small recess or gap found therebetween may be filled with a suitable sealant to bury the brim and continue the aerodynamically smooth surface between the band 56 and aircraft skin. The arc length X of the brim may be up to about 90 degrees to cover the sash up to its junction with the frame rib 32.

FIG. 5 illustrates schematically the predominant downstream direction of the airstream 16 during aircraft flight which is generally parallel with the horizontal minor axis 44 of the window. Since the window is annular, the local direction of the airstream changes relative to the local geometry of the window, and specifically the local geometry of the sash 24 and its protective shield 54.

Since the forward and aft posts of the window are oriented vertically or generally parallel with the major axis 46, the airstream flows generally perpendicularly thereover during operation first passing the forward post and then passing the aft post. Accordingly, the outer brim 58 on the forward post 62 acts as the leading edge of shield, but becomes the trailing edge of the shield along the aft post 64.

Correspondingly, the inner clip 60 forms the trailing edge along the forward post 62, but becomes the leading edge along the aft post 64.

Since the rails 66,68 of the shield are oriented generally parallel with the minor axis 44 in the predominant direction of the airstream 16, the airstream will similarly flow generally parallel along the brim and clip portions thereof.

However, since the exemplary configuration of the window is vertically oblong and generally rectangular, the posts and rails thereof are correspondingly arcuate, with the rails joining the posts at arcuate corners around the central aperture. This further complicates the relative high speed flow of the airstream along the locally curved corner portions of the sash and shield specifically along the two rails and their junctures with the posts.

Since the sash 24 illustrated in FIG. 5 tapers radially inwardly to the relatively thin inner lip 48, the corresponding transverse section of the erosion shield 54 complements that taper to surround the window pane and minimize any inboard offset of the pane from the aerodynamically smooth outer mold line or surface of the aircraft.

Accordingly, the inner clip 60 is preferably smaller in size and depth than the larger outer brim 58 to conform with the thin lip 48 and taper of the sash.

As initially shown in FIG. 5, the inner clip 60 is preferentially asymmetric around the central aperture 26 to accommodate the taper in the sash 24 and the local differences in incident airstream during aircraft flight. In particular, the inner clip 60 has different transverse arc length Y,Z in the corresponding forward and aft shield posts 62,64 which differences carry over into the corresponding rails 66,68.

Since the predominant direction of the airstream 16 in FIG. 5 is from left to right, the inner clip 60 is preferentially longer in arc length Z along the aft shield post 64 than along the forward shield post 62.

Since the frame sash 24 increases in thickness radially outwardly from its inner lip 48 to its junction with the annular frame rib 32, the outer brim 58 of the erosion shield 54 preferably has a larger arc length X and transverse curvature or radius than that of the inner clip 60 whose curvature or radius is relatively small to wrap around the relatively narrow sash lip 48, with the corresponding arc length Y,Z being suitably small.

For example, the inner clip 60 may have a transverse arc length Y of about a quarter-circle, or 90 degrees, along the length of the forward post 62 to define a trailing edge therefor. And, the same clip 60 has an aft arc length Z of about a half-circle, or 180 degrees, along the aft post 64 which defines the leading edge thereof. The forward arc length Y and the aft arc length Z remain substantially uniform or constant over the full vertical length of the forward and aft posts 62,64 and continue uniform in size into corresponding forward and aft portions of the two rails 66,68.

In this way, the larger size clip 60 along the leading edge of the aft post 64 may fully cover the narrow lip 48 of the aft post to provide full surface erosion protection thereof and prevent infiltration of the incident high speed ambient airstream between the shield and aft post. However, the inner clip 60 defines the trailing edge in the forward post 62 and need not be as large since the airstream does not impinge the trailing edge but leaves a wake thereat.

As shown in FIG. 5, the inner clip 60 is preferentially small along the forward post 62 and larger along the aft post 64, and therefore increases in size or arcuate length symmetrically along both the upper and lower shield rails 66,68 between the forward and aft shield posts 62,64. Along the trailing edge of the forward post, the clip 60 has the smaller arc length Y, and along the leading edge of the aft post 64 the clip 60 has the larger arc length Z, with a suitable transition in arc length laterally therebetween.

For example, the arc length of the clip 60 may increase linearly between the two posts as illustrated, or may have an abrupt increase as desired. Since the major axis 46 laterally splits the window frame and shield in substantially two equal parts or halves, the transition increase in arc length preferably occurs along both rails 66,68 closely adjacent to or near the intersection of the major axis with the middles thereof, or the 12 o'clock and 6 o'clock positions.

The transition in size of the clip 60 shown in FIG. 5 may occur at the top and bottom of the shield in a relatively small arcuate transition range K of a few degrees both forward and aft of the vertical centerline of the shield. In this transition region K, the freestream air 16 travels generally parallel along the shield and its clip junction with the mounted window pane, and begins the transition for the leading edge of the aft post for which maximum erosion protection is desired.

The resulting asymmetric configuration of the annular erosion shield 54 illustrated in FIG. 5 therefore provides maximum erosion protection along all leading edge regions of the annular sash 24, as the leading edge transitions from the outer brim 58 along the forward shield post 62 to the inner clip 60 along the aft shield post 64, with the changeover in relative position of leading and trailing edges occurring similarly along both rails 66,68.

Correspondingly, the inboard annulus or track 70 defined by the bowed sheet metal shield 54 conforms with the exposed surface of the underlying tapered sash 24. The track 70 diverges or widens inwardly along the forward shield post 62 to cover the underlying forward frame post 36. In contrast, the track 70 along the aft shield post 64 converges slightly inwardly due to the larger hook-shaped clip 60, and correspondingly provides a mechanical J-hook attachment over the aft frame post 38.

Figure 6:
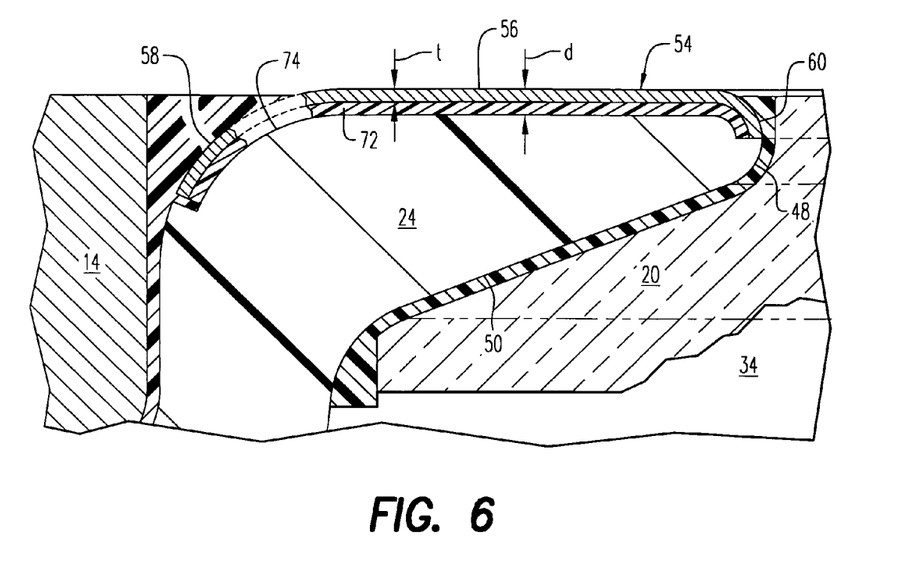
FIG. 6 is a further enlarged transverse sectional view of an exemplary portion of the erosion shield bonded to the supporting sash.

FIG. 6 illustrates an enlarged sectional view of a portion of the integrated window frame and shield illustrated in FIG. 5, with the entire erosion shield 54 being fixedly bonded to the otherwise exposed surface of the frame sash 24 using a suitable adhesive 72, such as epoxy.

The thin erosion shield 54 is preferably mounted flush in the external surface of the sash 24 which has a corresponding recessed seat 74 specifically configured therefor. The seat 74 may be accurately machined into the external surface of the composite sash 24 with a suitable depth d so that the combined thickness of the thin shield 54 and underlying adhesive 72 permits flush mounting.

As indicated above, the thickness t of the sheet metal shield 54 may be amount 8 mils (0.2 mm), and correspondingly the depth d of the seat 74 is suitably larger for mounting flush the shield using the adhesive. For example, the depth d of the seat may be about 15 mils (0.38 mm) with the difference in thickness being provided for the thickness of the specific adhesive used.

The seat 74 faces outwardly and receives inwardly the inside track of the erosion shield 54 so that the outer brim 58 remains flush with the sash 24 at its supporting end, and the arcuate clip 60 remains flush with the sash around the inner lip 48, and the middle band 56 provides a smooth surface with the aircraft skin.

Accordingly, the inboard side of erosion shield 54 which defines the annular track 70 conforms with the machined seat 74 over the outboard side of the window sash 24. And, the transversely opposite outboard side of the erosion shield maintains an aerodynamically smooth surface with the surrounding aircraft skin. Aerodynamic pressure losses are therefore reduced due to the smooth erosion shield protecting the underlying window frame.

The outer brim 58 of the erosion shield blends inboard into the surrounding aperture of the aircraft skin to prevent infiltration of the high speed airstream. The corresponding gap around the brim 58 may be suitably filled with a sealant for providing a continuous and smooth junction with the surrounding aircraft skin.

And quite significantly, the thin narrow lip 48 of the window sash 24 is protected by the exposed outer clip 60 of the shield with larger surface coverage along the leading edge lip 48 of the aft shield post 62 than along the trailing edge lip 48 of the forward shield post 62.

Accordingly, the unitary sheet metal erosion shield 54 described above is relatively simple in configuration yet enjoys multiple advantages in configuration, manufacture, assembly, and performance.

Figure 7:
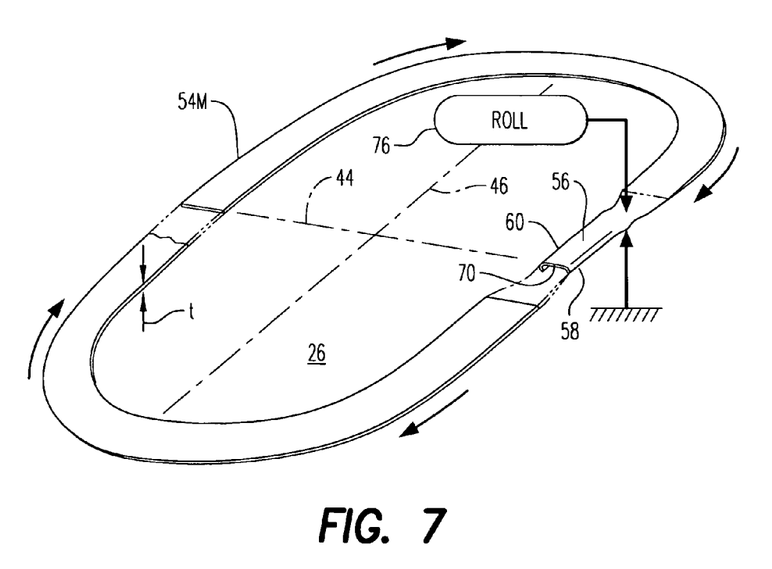
FIG. 7 is a schematic view of a method for cold roll forming a flat sheet metal annulus into the unitary annular erosion shield illustrated in the several Figures.

For example, FIG. 7 illustrates schematically an exemplary method of making or fabricating the erosion shield from an initially flat metal sheet 54M.

The initially flat metal sheet 54M is suitably cut to the requisite oblong configuration with sufficient material for forming the corresponding parts of the final erosion shield.

A suitable roll forming apparatus 76 may be used for plastically cold roll forming the initially flat sheet 54M into the final 3D configuration of the erosion shield. The flat sheet is suitably driven through the apparatus 76 in one or more passes to roll to shape the bowed outer brim 58 and inner clip 60 forming the requisite inboard track 70.

A suitable cold roll forming process for forming the shield 54 may be commercially performed by Ducommun Aero Structures of Gardena, Calif.

The final erosion shield 54 is a fully annular component having increased strength and stiffness due to the bending moment of inertia created by the 3D transverse sectional profile of the track. Yet, the relatively narrow annulus of the relatively large perimeter of the shield introduces into the shield significant elastic flexibility which may be used for additional advantage in both assembly with the underlying window frame 18 and for the differences in window curvature.

More specifically, FIG. 5 also illustrates schematically a method of assembling the 3D erosion shield 54 atop the underlying composite window frame 18.

Since the aft clip 60 is generally semi-circular and partially closes the aft track 70 in a collective form of a J-hook, the assembly process may easily commence by hooking the clip 60 from the aft post 64 of the shield to the complementary arcuate lip 48 along the corresponding aft post 38 of the frame. The inherent flexibility of the thin annulus erosion shield allows the aft post 64 thereof to be clipped or hooked along most of the length thereof to the aft lip 48 of the underlying frame.

Since the inner clip 60 decreases in size along the rails of the shield from semi-circular to quarter-circular, the assembly process may be simply completed by snapping inwardly into position the diverging track 70 around the corresponding portions of the sash 24 firstly along both shield rails 66,68 as they snap into position on the corresponding frame rails 40,42. And then, the forward track 70 of the forward shield post 62 is snapped downwardly into its seated position atop the forward frame post 36.

The J-form of the aft track 70 provides a mechanical interlock between the aft shield post 64 and the underlying aft frame post 38, which correspondingly locks the entire annular shield atop the corresponding seat along both rails 40,42 and forward post 38 of the underlying frame.

The adhesive 72 is suitably applied between the shield and sash immediately prior to the assembly thereof. The installed shield is therefore both mechanically and adhesively attached to the underlying window sash in an integral assembly therewith.

Conversely, any attempt to disassemble the shield from the frame requires overcoming the cured adhesive 72 therebetween, as well as overcoming the substantial locking force created by the aft clip 60.

In FIG. 5, the high speed freestream air 16 flows downstream over the erosion shield during operation and flows over the underlying window pane which is preferably mounted slightly recessed, about 1-3 mils (0.02-0.08 mm) for example, within the erosion shield in the central aperture 26 as shown in FIG. 6.

Since the aft clip 60 wraps partially around the narrow lip 48, significant reaction loads prevent the high speed airstream from infiltrating this leading edge joint. And, the full surface coverage of the aft clip 60 fully protects the leading edge of the underlying aft frame post 38.

A suitable sealant or gasket may be provided between the pane and its sash seat 50, and may also be used to fill the gap between the clip 60 and pane.

Figure 8:
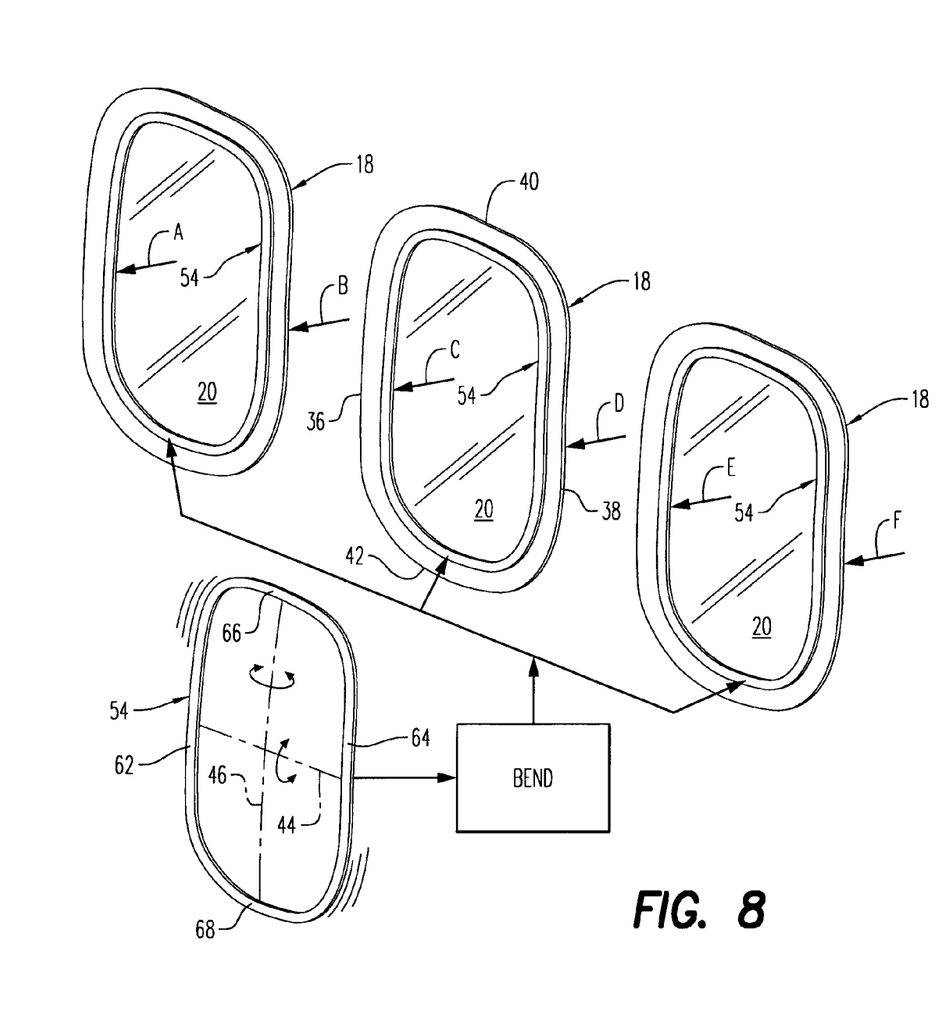
FIG. 8 is a schematic view of a common erosion shield sized and configured for identical use with three common window frames having different curvature.

A further advantage of the 3D configuration of the unitary erosion shield 54 is illustrated schematically in FIG. 8. As indicated above, the aircraft includes corresponding rows of windows on opposite sides of the fuselage which share the common configuration of the oblong window frame 18. Due to the changing curvature of the tubular aircraft cabin, the window frames 18 conform with that curvature indicated generally by the radius A introduced above.

However, the curvature or radius of the cabin and corresponding windows varies between the front and back of the aircraft, and therefore the corresponding curvature of each window frame may vary not only from window to window but may also vary between the two posts 36,38 in an individual window. In FIG. 8, this is represented by the six radii of curvature A-F which may vary by a mere fraction of one percent.

Nevertheless, even this small variation in curvature requires corresponding changes in configuration of the windows for the different locations in the aircraft cabin.

A single aircraft may have about ninety-two windows in seventeen different sizes and configurations, including five weights from extra light to extra heavy. All of the windows will have similar oblong configurations, and all of the windows will use a corresponding oblong erosion shield.

However, instead of having seventeen different sized erosion shields 54 for the seventeen different sized window frames, the inherent flexibility of the erosion shield may be used to advantage for decreasing the number of different designs required therefor.

For example, a plurality of the window frames 18 may have different curvature A-F along their posts requiring differently sized window frames 18 therefor, but those different window frames may share a common or identical size and configuration erosion shield 54.

In particular, each of the three window frames 18 illustrated in FIG. 8 may have an identical erosion shield 54 differing only in corresponding curvature thereof to conform or match with the different curvature A-F of the three window frames.

The common design erosion shield 54 may therefore simply undergo elastic bending during hook and snap assembly to the underlying different window frames to match the different curvature thereof within the elastic flexibility of the erosion shield.

FIG. 8 illustrates schematically that the one design erosion shield 54 may undergo elastic bending along either the minor axis 44 or the major axis 46, or both axes, to match the different curvatures A-F of the different window frames. The common design erosion shield therefore reduces the total number of different parts or design drawings required for a specific aerodynamic application, and this correspondingly reduces cost of manufacture.

Accordingly, the relatively simple sheet metal erosion shield 54 disclosed above conforms readily with the 3D configuration of the tapered window sash 24 to provide full perimeter erosion protection therefor while maintaining an aerodynamically smooth profile with the window pane 20 mounted inside the sash and the aircraft skin surrounding the sash. The shield is preferentially asymmetric to provide a mechanical interlock between the shield and tapered sash which is effectively resistant to the aerodynamic pressure forces of the high speed freestream airflow past the window during aircraft flight.

The erosion shield is readily manufactured from common sheet metal and rolled or stamped to shape as desired, and readily affixed to the underlying composite window frame in an integrated assembly having increased strength and durability due to the cooperation of the high strength materials thereof.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims which we claim:

1. An aircraft window erosion shield comprising an annular band having a radially outer brim and a radially inner clip being convex and asymmetric in transverse arc length around a central aperture.

2. A shield according to claim 1 wherein said band is flat, and said brim and clip are both arcuate from an inboard side thereof to form an annular track surrounding said central aperture, and an opposite outboard side of said shield is aerodynamically smooth therearound.

3. A shield according to claim 2 wherein:
said band, brim, and clip collectively comprise forward and aft posts spaced apart laterally along a minor axis of said shield, and upper and lower rails spaced apart longitudinally along a major axis of said shield to surround said central aperture; and
said clip is asymmetric on opposite sides of said major axis.

4. A shield according to claim 3 wherein clip is longer in arc length along said aft post than along said forward post.

5. A shield according to claim 4 wherein said clip has an arc length of about a quarter-circle along said forward post and an arc length of about a half-circle along said aft post.

6. A shield according to claim 4 wherein said clip increases in arc length along both said upper and lower rails between said forward and aft posts.

7. A shield according to claim 4 wherein said clip increases in arc length along both said upper and lower rails near the intersection of said major axis with the middles thereof.

8. A shield according to claim 4 wherein said band and brim are symmetric around said central aperture.

9. A shield according to claim 4 wherein said brim has a uniform arc length along said posts and rails.

10. A shield according to claim 4 wherein said band, brim, and clip comprise a unitary metal sheet having a constant thickness.

11. A shield according to claim 10 wherein:
said brim has a uniform arc length along said posts and rails;
said clip is longer in arc length along said aft post than along said forward post; and
said track widens along said forward post and narrows along said aft post.

12. A shield according to claim 11 wherein said brim has a larger transverse curvature than said clip.

13. A shield according to claim 4 further comprising a laminated window frame having an outer rim and an inner sash surrounding said central aperture, and said band is bonded to said sash, with said clip surrounding said central aperture, and said brim terminating inside said rim.

14. An apparatus according to claim 13 wherein said sash includes a recessed seat facing outboard, and said band, brim, and clip are mounted flush in said seat.

15. An apparatus according to claim 13 further comprising a plurality of window frames having different curvature, and each of said frames includes an identical erosion shield differing only in corresponding curvature due to flexibility of said shields.

16. A method of assembling said shield and frame according to claim 13 comprising:
hooking said clip from said aft post of said shield to a complementary lip along a corresponding aft post of said frame; and
snapping into position said track around said sash along both rails of said shield and concluding with said forward post.

17. An erosion shield comprising:
a unitary sheet metal ring having a flat annular band, a surrounding outer brim, and an inner convex clip bounding a central aperture;
said brim and clip both being transversely arcuate from a common inboard side of said shield to define an annular track surrounding said aperture; and
said clip being asymmetric in transverse arc length around said aperture.

18. A shield according to claim 17 wherein:
said band, brim, and clip collectively form forward and aft posts spaced apart laterally along a minor axis of said shield, and upper and lower rails spaced apart longitudinally along a longer major axis of said shield to form an oblong central aperture; and
said clip has different transverse arc length in said forward and aft posts.

19. A shield according to claim 18 wherein:
said band, brim, and clip collectively have an aerodynamically smooth outboard side transversely opposite to said inboard track;
said band and brim are symmetrical around said inner clip, with said brim having a uniform arc length radially outwardly from said band;
said clip is longer in arc length along said aft post then along said forward post; and
said clip increases in arc length along said rails.

20. An aircraft window comprising:
a composite frame including a radially outer rim and radially inner sash surrounding a central aperture; and
a sheet metal erosion shield including an annular band bonded to an outboard side of said sash, a radially outer brim blending said band to said surrounding rim, and a radially inner clip lining said sash asymmetrically in transverse convex arc length around said central aperture.

21. A window according to claim 20 wherein:
said frame rim and sash collectively form forward and aft posts spaced apart laterally along a minor axis, and upper and lower rails spaced apart longitudinal along a longer major axis to form an oblong central aperture;
said shield band, brim, and clip collectively form corresponding forward and aft posts and upper and lower rails surrounding said oblong aperture; and
said shield is symmetrical around said aperture except for said asymmetric clip.

22. A window according to claim 21 wherein said clip is symmetrical on opposite sides of said minor axis and asymmetrical on opposite sides of said major axis.

23. A window according to claim 22 wherein:
said clip is longer in arc length along said aft shield post then along said forward shield post; and
said clip increases in arc length along said shield rails.

24. A window according to claim 23 wherein:
said band, brim, and clip collectively form an annular track on a common inboard side of said shield surrounding said oblong aperture, and collectively form an aerodynamically smooth opposite outboard side; and
said shield is bonded flush in a corresponding recessed seat formed in said sash radially between said oblong aperture and said surrounding rim.

25. A window according to claim 24 wherein said frame comprises common fibrous layers fixed in a rigid resin matrix extending radially through said rim and sash, with an outboard layer adjoining said shield at said sash, a transversely opposite inboard layer, and a plurality of different middle layers laminated therebetween.

* * * * *